United States Patent [19]

Rhoades et al.

[11] Patent Number: 5,020,330
[45] Date of Patent: Jun. 4, 1991

[54] $CO_2$ FOOD FREEZER

[75] Inventors: George D. Rhoades, La Grange, Ill.; Gary D. Lang, Wooster, Ohio

[73] Assignee: Liquid Carbonic Corporation, Chicago, Ill.

[21] Appl. No.: 496,457

[22] Filed: Mar. 20, 1990

Related U.S. Application Data

[63] Continuation-in-part of Ser. No. 373,056, Jun. 28, 1989, Pat. No. 4,953,365.

[51] Int. Cl.⁵ .................................. F25D 13/06
[52] U.S. Cl. .................................. 62/63; 62/381
[58] Field of Search .................. 62/381, 52.1, 63

[56] References Cited

U.S. PATENT DOCUMENTS

| | | | |
|---|---|---|---|
| 3,733,848 | 5/1973 | Duron et al. | 62/381 |
| 3,815,377 | 6/1974 | Tyree, Jr. | 62/62 |
| 3,866,432 | 2/1975 | Harrison | 62/381 |
| 4,023,381 | 5/1977 | Onodera | 62/381 |
| 4,078,394 | 3/1978 | Chamberlain et al. | 62/203 |
| 4,103,507 | 8/1978 | Benois | 62/381 |
| 4,324,110 | 4/1982 | Lovette, Jr. et al. | 62/381 |
| 4,333,318 | 6/1982 | Tyree, Jr. | 62/374 |
| 4,356,707 | 11/1982 | Tyree, Jr. et al. | 62/381 |
| 4,866,946 | 9/1989 | Klee | 62/381 |

Primary Examiner—Ronald C. Capossela
Attorney, Agent, or Firm—Fitch, Even, Tabin & Flannery

[57] ABSTRACT

A food freezer having a thermally insulated enclosure and an endless conveyor having a loading section, a food freezing section and an unloading section. Blowers circulate gas throughout the interior of the enclosure, and devices for injecting liquid $CO_2$ to preferably cause $CO_2$ snow particles to impinge upon the food products on the belt are located at selected positions about the belt and may be at various vertical levels, some of which are preferably at least slightly above the belt. By piping the liquid $CO_2$ so that it flows only upward and/or horizontally toward the spray nozzles within the thermally insulated enclosure, any solid $CO_2$ that may accumulate adjacent the upstream side of the spray nozzle orifices is melted by $CO_2$ vapor which gravitates upward in the vertical piping.

13 Claims, 4 Drawing Sheets

$CO_2$ FOOD FREEZER

This application is a continuation-in-part of our application Ser. No. 373,056, filed Jun. 28, 1989, now U.S. Pat. No. 4,953,365.

This invention relates to freezers wherein food products or the like are cryogenically frozen with in a freezing region, and more particularly to a food freezing apparatus wherein food products or the like are continuously conveyed along a path and liquid $CO_2$ is injected to form solid $CO_2$ and $CO_2$ vapor to provide the low temperature environment which freezes the food products.

BACKGROUND OF THE INVENTION

There are many advantages to cryogenic freezing of food products which have come to light in the past several decades, and in a number of instances, carbon dioxide is the cryogen of choice for efficient and economical cryogenic freezing applications. Cryogenic carbon dioxide food freezers often utilize liquid carbon dioxide under pressure sufficient to maintain it in the liquid state and supply it to spray nozzles through which it is injected into the interior of a thermally insulated enclosure wherein the food products to be frozen are delivered to a freezing region, as by being transported on an endless conveyor or the like. In a $CO_2$ food freezer, the low temperatures which can be achieved by the creation of solid $CO_2$, can create a tendency for liquid $CO_2$ in the lines leading to the spray nozzles to freeze, particularly at times when there is no flow or only very low flow. Gassing systems have been devised and utilized to clear the lines of liquid $CO_2$ at certain times to prevent such freezing.

Freezing of food products is typically accomplished by heat transfer to the colder gas that is being circulated past the food products, although some heat may be withdrawn by direct removal to a vaporizing cryogen at the surface of such a food product. Accordingly, the movement of the gas and its velocity become important in accomplishing efficient freezing of the food products, and one or more blowers is generally always provided to assure the food products are exposed to and in contact with the circulating cold vapor.

U.S. Pat. No 4,356,707, in FIGS. 10-12, shows cabinet freezers including one having a spiral or helical conveyor wherein $CO_2$ injectors fed from an upper liquid $CO_2$ source are located in corner regions of the cabinet to inject $CO_2$ snow and cold vapor and to induce additional vapor flow generally horizontally and in a direction concurrent with the movement of the food products along the helical path. U.S. Pat. No. 4,324,110 shows a cryogenic food freezer wherein liquid $CO_2$ from an upper supply line 38 is injected through nozzles and discharged countercurrently into streams of moving gas or vapor from fans to effect rapid vaporization of the injected $CO_2$. U.S. Pat. No. 3,733,848 shows a food freezer wherein a header 82 extending along the roof of a freezer enclosure supplies spray nozzles that inject $CO_2$ into discharge streams from vertically elongated blowers having vane-carrying squirrel cage rotors which rotate about vertical axes. U.S. Pat. No. 4,078,394 shows a spiral freezer designed for cold gas to flow through the various regions of a helical belt by driving a center drum of circular cross-section having both its axial ends open and having a varied perforation pattern in its sidewall wherein gas sucked from the interior of the drum by a motor-driven is fan is discharged past a plurality of injectors in the top wall of the freezer where $CO_2$ vapor is injected to effect cooling of the gaseous atmosphere.

When liquid $CO_2$ is injected through spray nozzles located within a thermally insulated enclosure, it is possible for solid cryogen to begin to form in the lines leading to the nozzles as by freezing liquid $CO_2$ which is in contact with the cold metal surfaces of the lines within such cold environment and/or the nozzles, which can cause the nozzle orifices to clog. Moreover, there is always the possibility that small amounts of $CO_2$ snow will also form in the lines through momentary pressure drops, and because of the cold environment, such snow will be relatively slow to redissolve in liquid $CO_2$ and will generally be carried along to the snow nozzles where buildup and blockage can occur. Inefficiencies result from such clogged spray nozzles in a freezer, and accordingly, solutions to such problems were sought.

SUMMARY OF THE INVENTION

One object of the present invention is to provide an improved $CO_2$ food freezer wherein more efficient overall freezing is achieved by means of improved injection of liquid $CO_2$ using nozzles which are self-unclogging.

It has been found that, by piping a $CO_2$ food freezer from the bottom so that there are no downward extending legs in the piping arrangement leading to the spray nozzles but only vertically upward or horizontal or diagonally upward legs, a self-unclogging arrangement is achieved. In such an arrangement, the small amounts of $CO_2$ vapor in the liquid line will flow by gravity upward in the piping and reach the upstream side of the spray nozzle orifices, and as a result, any $CO_2$ snow accumulating in this region that would potentially build up and eventually clog such nozzles will be melted to liquid by the warmer vapor. In addition, by appropriately jacketing pipes or headers that carry liquid $CO_2$ within such a cryogenic temperature environment, particularly where the pipe in question is generally vertically aligned, a natural convection flow of ambient air can be created in the jacketed region, so that ambient atmosphere provides sufficient warmth immediately adjacent this region of the liquid $CO_2$ piping to prevent freezing

DETAILED DESCRIPTION OF THE PREFERRED EMBODIMENTS

Figure 1:
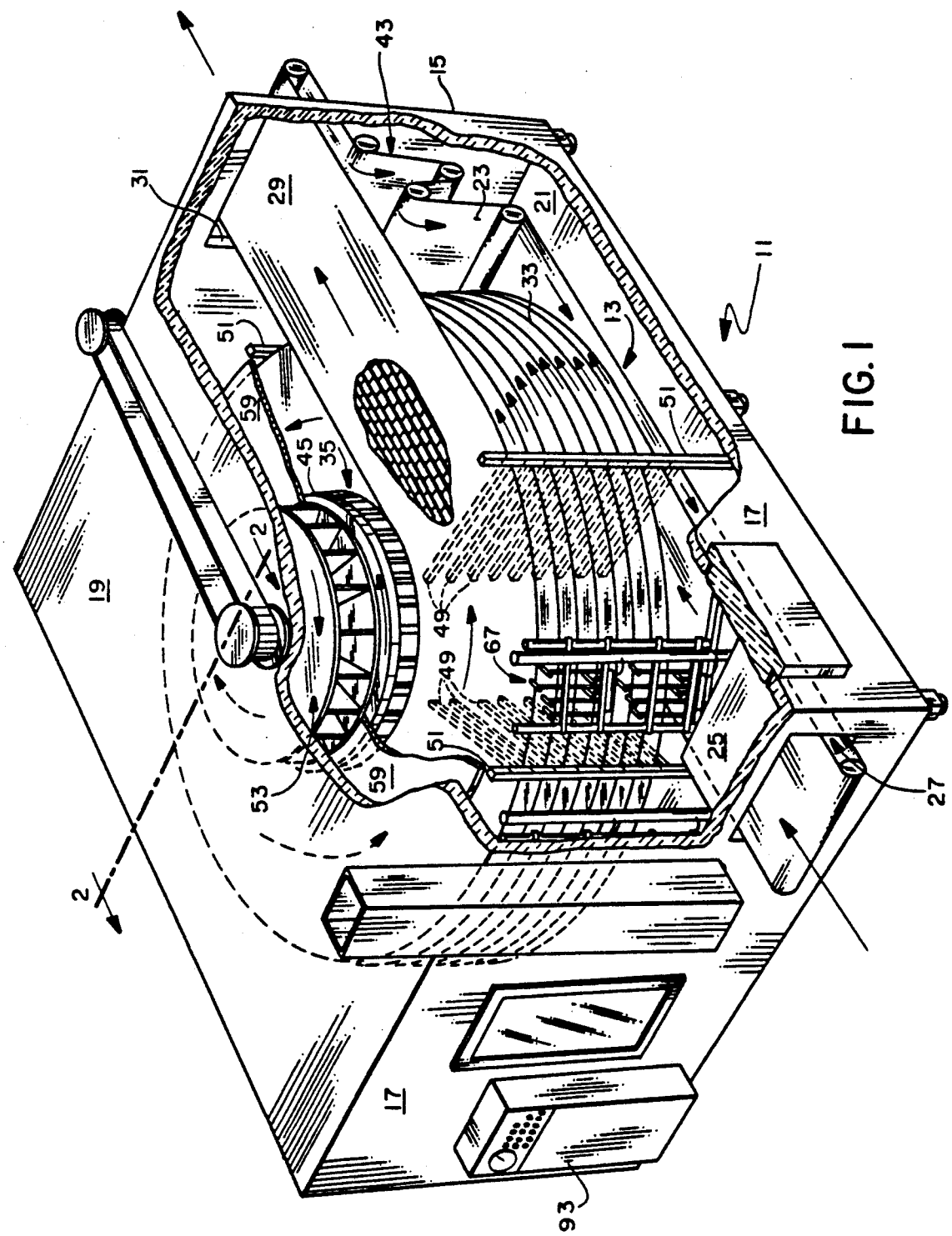
FIG. 1 is a perspective view of a $CO_2$ food freezer embodying various features of the present invention.

A food freezer 11 is designed to rapidly and efficiently freeze food products or the like which move along a continuous conveyor 13 as they travel along a helical path which constitutes the major portion of the length of travel within an insulated cabinet or enclosure 15. Illustrated in FIGS. 1 through 4 is a freezer which includes a large insulated cabinet 15 generally in the form of a rectangular parallelepiped having four vertical walls 17, a top wall 19 and a bottom wall 21, all of which are suitably, thermally insulated to maintain a low-temperature environment therewithin. Several doors and, if desired, a window are included to provide physical and visual access to the interior of the cabinet wherein an endless conveyor belt 23 of highly porous, i.e., open mesh, construction is located, as is well known in this art.

The conveyor includes such an endless belt 23, preferably made of stainless steel, which is arranged to have a short straight-line loading section 25 disposed near the bottom of the cabinet which may protrude a short distance through an entrance opening 27 in the cabinet enclosure. It should also have a short, straight, unloading or exit section 29 that may also similarly extend a short distance through an upper exit opening 31 in the insulated wall of the enclosure. The conveyor can be of the type generally illustrated in U.S. Pat. No. 4,078,655, issued Mar. 14, 1978, or in U.S. Pat. No. 4,878,362, to Lewis Tyree, Jr., issued Nov. 7, 1989, the disclosures of which are incorporated herein by reference. The entrance and exit openings 27, 31 are generally aligned with each other and are adjacent lower and upper corners of opposite walls of the enclosure. A main curved section 33 of the endless conveyor belt 23 lies between the straight loading and unloading sections wherein the belt travels along a helical path in a plurality of flights or tiers about a center cage or drum 35 which is drivingly rotated.

The cage 35 is preferably circular in horizontal cross-section, although it might be oval or have some other generally circular shape. The rotatable cage is mounted on a composite center shaft assembly 37 which extends downward through the bottom wall 21 of the insulated enclosure; the shaft carries the usual bearings (not shown) and terminates in a sprocket or gear 39 which is preferably driven by a chain 40 that extends laterally to a drive motor (not shown) mounted adjacent the wall of the enclosure containing the exit opening 31, all as well known in this art. A tensioning motor is also preferably located near the exit and provides suitable low tension in the belt to assure that it remains in engagement, usually frictional, with the exterior surface of the central rotating cage 35 which provides the primary motive power for the conveyor throughout nearly all of its length. A belt take-up arrangement 43 is also preferably provided inside the insulated cabinet 15 which compensates for the difference in the overall length of the belt 23 when the freezer is at ambient conditions and when the belt is in its shorter contracted state during operation at temperatures below freezing.

As can best be seen in FIG. 1, the belt proceeds generally along the bottom wall of the enclosure to the entrance opening 27 where it extends outward for a short distance to constitute the loading section 25 where food products to be frozen are received. At the end of the straight-line loading section, the belt undergoes a transition to the curved orientation where it engages, usually frictionally, the outer surface of the rotating cage and begins its travel along a plurality of tiers, for example, nine or ten, as it proceeds gradually upward until finally undergoing a transition back to the straight-line unloading section 29. The rotating cage 35 is usually supported generally along its upper rim 45 by guide rollers or the like (not shown) mounted within the enclosure, and the individual tiers of the belt in its helical section 33 are supported by arms 49 at each vertical level which extend radially inward from a plurality of vertical posts 51 which extend between the top and bottom walls of the insulated enclosure 15.

The circulation of the gas or atmosphere within the insulated enclosure is affected by a large centrifugal blower 53, preferably one of those commercially referred to as a "Plug Fan", which includes a convolute entrance guide 55 that leads to the chamber wherein a vane-carrying wheel 57 rotates. The blower 53 is mounted coaxially with the rotating cage 35 at a location vertically thereabove. The entrance baffle 55 to the blower is preferably proportioned to provide clearance between it and the interior surface of the rotating cage which may have an imperforate sleeve 58 which depends from the upper rim 45 and prevents short circuit flow therethrough in the region of the entrance guide. Alternatively, the imperforate sleeve 58 could be provided as a depending portion of an overlying baffle that directs the discharge flow from the blower. The blower 53 takes its suction from the interior of the cage and discharges high pressure gas horizontally outward throughout 360° generally along the undersurface of the top insulated wall 19 of the enclosure and across a ring-shaped cover or baffle 59 that overlies the helical conveyor section. Whereas the upper end of the rotating cage 35 is in open communication with the blower, the lower or bottom end of the rotating cage is completely closed by a conical bottom wall 60 which is affixed at its upper end to the center shaft assembly 37.

Figure 2:
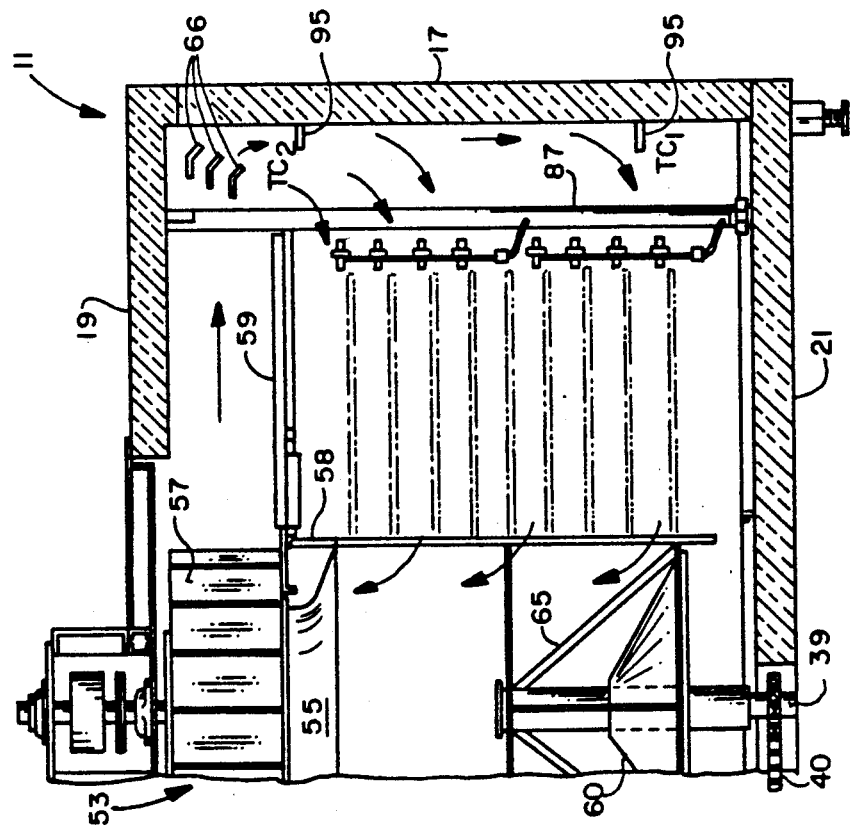
FIG. 2 is a vertical sectional view of a portion of the food freezer taken generally along the line 2—2 of FIG. 1.

The cage includes an upper rim or ring 45, and a similar lower rim, which are interconnected by a plurality of vertical bars 63 that are equidistantly spaced apart from one another and constitute the sidewall region of the cage. Struts 65 extending between the cage shaft assembly and the sidewall at the rim provide overall structural strength to the cage structure and stabilize the composite drive shaft assembly 37 therewithin. Inasmuch as the entire bottom of the cage is closed, the gas being sucked from the interior of the cage by the blower 53 comes through the spacings between the cage bars 63 in the sidewall, and the conical shape of the bottom wall 60 assures an aerodynamically smooth flow pattern in the lowermost region of the cage. Thus, this arrangement creates a radial inflow of gas for essentially 360° throughout the sidewall of the cage and subjects the food products carried by the belt in the helical section 33 to heat transfer with such radial inflow of cold gas. To complete the overall, generally toroidal circulation pattern, the gas being discharged horizontally from the blower travels toward and then downward at the four vertical walls 17 of the enclosure, along which it flows until beginning its radially inward path through the conveyor. The gas flow is assisted in turning downward by a plurality of turning vanes 66 (FIG. 2).

Figure 4:
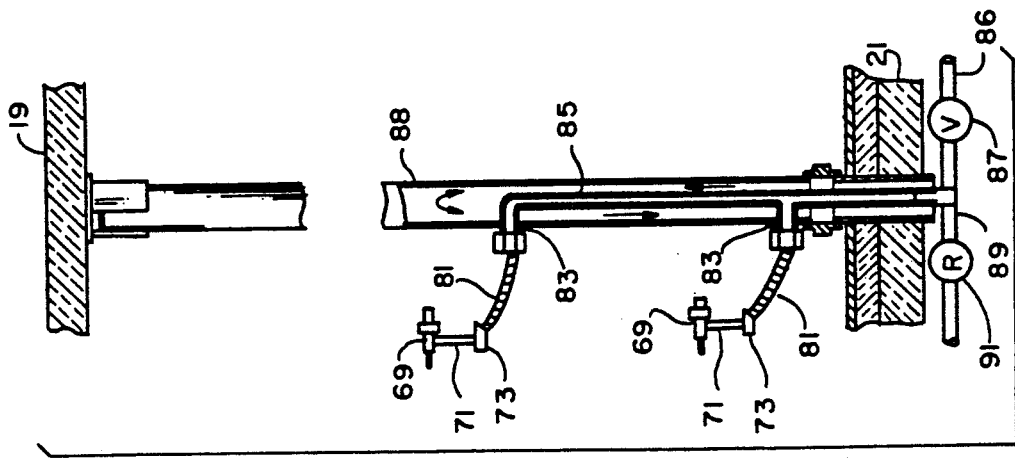
FIG. 4 is a vertical sectional view, enlarged in size, with portions broken away, taken along the line 4—4 of FIG. 3.
Figure 3:
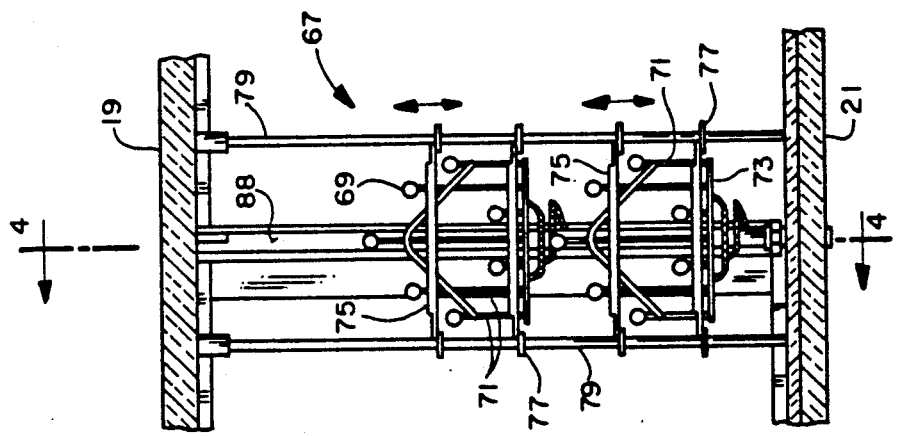
FIG. 3 is a fragmentary elevational view showing the cryogen injection apparatus taken looking generally along the line 3—3 of FIG. 2.

Cooling for the freezer is provided by injecting liquid carbon dioxide through nozzles directed radially inward so that the injected $CO_2$ snow travels concurrently with the flow of gas and impinges upon the food products being carried on the helical section 33 of the conveyor. The freezer 11 contains five separate banks or sets of arrays 67 of spray nozzles 69; however, fewer or additional arrays could be used. As best seen in FIG. 3, an array includes seven spring-loaded spray nozzles each connected via a vertical tube 71 to a horizontal manifold 73. A vertically adjustable bracket assembly 75 is provided which is mechanically interconnected, as by welding or the like, with each of the vertical tubes 71. Each bracket assembly includes four split-collar assemblies 77 which are slidably received upon a pair of vertical rods 79 of circular cross-section that extend from the bottom wall to the top wall of the enclosure; these allow the nozzle array to be adjusted to an appropriate vertical level where the radially inward cryogen sprays from the nozzles 69 will impinge against food products on four different tiers of the helical conveyor section. A flexible conduit 81 is employed to interconnect each manifold 73 to a slightly lower outlet 83 on a permanently mounted vertical pipe 85 extending upward through the insulated floor 21 of the enclosure which pipe serves as a header and contains a plurality of side outlets 83, as best seen in FIG. 4. As a result, each pipe supplies liquid $CO_2$ upward to at least two arrays 67 of spray nozzles.

Liquid $CO_2$ is supplied via a liquid $CO_2$ line 86 through a flow control means or valve 87 (FIG. 4), located upstream of the entrance of the pipe 85 into the enclosure through the bottom wall 21, that controls the downstream pressure and the rate of flow therethrough by modulating, in response to the demand for refrigeration as discussed hereinafter. To inject $CO_2$ snow, the spray nozzles 69 preferably have spring-loaded stem arrangements set to open at a supply pressure of about 125 psig or higher and preferably at a pressure of at least about 200 psig. When injected into an environment at about atmospheric pressure, liquid $CO_2$ is immediately transformed to a mixture of $CO_2$ snow and cold $CO_2$ vapor, and the snow impinges against the food products being carried on the continuously moving conveyor belt. It is possible that liquid $CO_2$, at pressures between about 125 psig and about 300 psig, may freeze to solid $CO_2$ in a cold environment; it is also possible that minor amounts of solid $CO_2$ will form in a flowing stream of liquid $CO_2$ as a result of momentary pressure drops, which solid $CO_2$ will be carried along to a nozzle orifice and accumulate on the upstream side thereof where it can cause clogging. It has been found that, by surrounding each of the liquid cryogen pipes 85 with a coaxial riser tube 88 that extends upward through the bottom wall of the insulated enclosure and is open to ambient conditions below the freezer, a positive deterrent to such freezing is provided. Because the annular region between the riser tube 88 and the $CO_2$ feed pipe 85 is open to the atmosphere at its bottom, a natural convection flow of ambient air upward and downward through this annular region is created which warms the cryogen feed pipe sufficiently to prevent any such freezing.

In addition, the piping is arranged so that the flow path within the cold environment from the liquid flow control valve 87 is either horizontal or upward to the individual spray nozzles (having no downward oriented sections behind which vapor could be trapped), and a connection downstream from the control valve 87 is also provided to a vapor line 89, which is conveniently made to the bottom end of each $CO_2$ pipe 85 adjacent its connection to the high pressure liquid $CO_2$ line 86. The vapor pressure in the line 89 should be above the triple point pressure of $CO_2$, i.e., 75 psig, and it is preferably at least about 150 psig, so as to assure that the pressure in the pipe 85 and in the associated piping to the spray nozzles is maintained above the triple point pressure. Moreover, it is preferably set just slightly above the pressure at which the spring-loaded spray nozzles are set to open so that a slow flow of vapor is maintained through the nozzles after the control valve has closed and all liquid $CO_2$ has been purged, e.g. a vapor flow of about 15-25 standard cubic feet per hour. For example, $CO_2$ vapor, at about 160 psig, reduced from the usual storage vessel pressure of 300 psig by a pressure regulator 91, may be provided when the spray nozzles are set to open at about 155 to 158 psig.

During normal operation, the reduction in pressure at the flow control valve 87 results in the creation of some $CO_2$ vapor which travels with the flowing liquid; $CO_2$ solids that are formed, as mentioned above, and carried to the orifices of the spray nozzles can result in momentary clogging. If clogging occurs, $CO_2$ vapor bubbles will gravitate upward through the liquid $CO_2$ in the vertical feed pipe and in the associated array of spray nozzles to the blocked orifice where the vapor will melt any solid $CO_2$ to create liquid $CO_2$, removing the blockage. Whenever the control valve 87 is shut, the connection to the line 89 assures a minimum pressure of at least about 160 psig is maintained upstream of the spray nozzles. If the freezer is to be shut down for a period of time, the remaining liquid $CO_2$ in the feed pipe 85 and in the piping downstream of the control valve 87 will slowly vaporize at the pressure of the vapor line 89 which exceeds the setting of the spring-loaded spray nozzles, so that one or more of them will open, slowly venting $CO_2$ vapor into the freezer until all of the liquid $CO_2$ has vaporized. Even if the supply of vapor to the regulator 91 should be halted before all of the liquid $CO_2$ has vaporized, it will simply vaporize as the freezer is allowed to warm up.

In such a cryogenic food freezer, liquid $CO_2$ is generally fed simultaneously to the spray nozzles 69 of all of the banks of arrays in the different locations. Control is normally via a control system 93, mounted as a part of a panel which also receives a signal from a monitor for the temperature within the enclosure 15; by causing the control valve 87 to modulate, the control system adjusts the flow rate of liquid $CO_2$ being fed to the injectors so as to maintain the temperature in the freezer within a desired range. It will, of course, be realized that the temperature will vary somewhat, depending upon where it is measured within the enclosure, inasmuch as the vapor warms as it passes over the food products and, of course, cools when it intermingles with fresh cold vapor that is being generated along with the $CO_2$ snow being injected from the spray nozzles. It is generally accepted that a representative temperature reading in freezers of this general type is obtained by measuring the temperature at one or more locations in a vapor section relatively isolated from the injection of cryogen. Accordingly, a pair of thermocouples 95 or other suitable temperature-measuring devices are provided at appropriate locations within the freezer, for example, along one vertical wall 17 at distances downward from the top and upward from the bottom, as depicted in FIG. 2, equal to about one-fourth of the height of the chamber, which send signals to the control system 93 that are used to modulate the injection flow of liquid $CO_2$ through the spray nozzles—usually by altering the downstream pressure of liquid $CO_2$ exiting the pressure-regulating valve 87 and thus the rate of flow through the valve. Preferably, a plurality of thermocouples or other temperature sensors 95 are provided within the freezer, and the signals from these are averaged to control the temperature within the freezer.

As an example of the efficiency of a freezer of this general design, tests are run with a freezer having about 230 feet of conveyor belt, which includes the loading section 25, the main helical section 33 and the unloading section 29. Liquid carbon dioxide is supplied to the arrays of spray nozzles so as to impinge $CO_2$ snow upon chicken nuggets, which are discrete, compressed, cooked, composite pieces of chicken about one inch in greatest dimension. The belt is about 34 inches wide and is operated at a lineal speed of about 16 feet per minute. As such, over a dwell period of about 14–16 minutes, the freezer is able to freeze the entire output from two nugget-forming machines, which together supply about 3400 pounds of chicken nuggets per hour to the freezer. The chicken nuggets being supplied are coated with a batter and breading and, following immersion frying, are at a temperature of about 180° F. when deposited on the loading section of the conveyor. The efficiency of the freezer is such that, by maintaining a gas atmosphere temperature of about $-40°$ F. within the freezer, it is found that the chicken nuggets are acceptably uniformly frozen across the width of the belt. Examination of individual nuggets shows that their innermost regions have hardened and their outer regions have not been cooled lower than necessary upon reaching the unloading section of the conveyor. Calculations show that, by delivering about 5690 pounds per hour of liquid $CO_2$ (at about 0° F. and 300 psig) to the freezer, freezing of about 3400 pounds per hour of chicken nuggets to an equilibrated temperature of about 10° F. is achieved.

Figure 5:
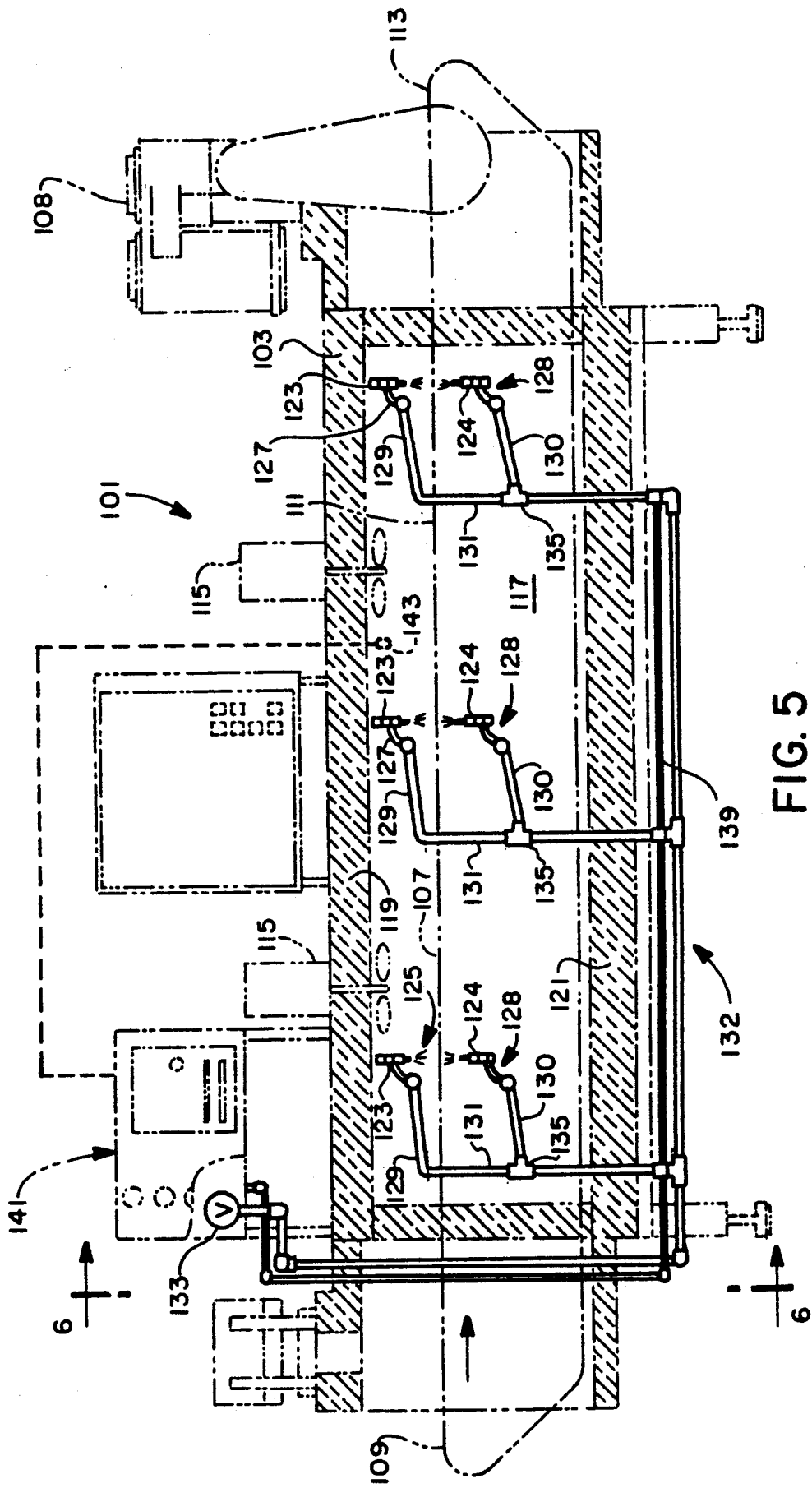
FIG. 5 is a front view of a $CO_2$ tunnel-type food freezer embodying various features of the invention.
Figure 6:
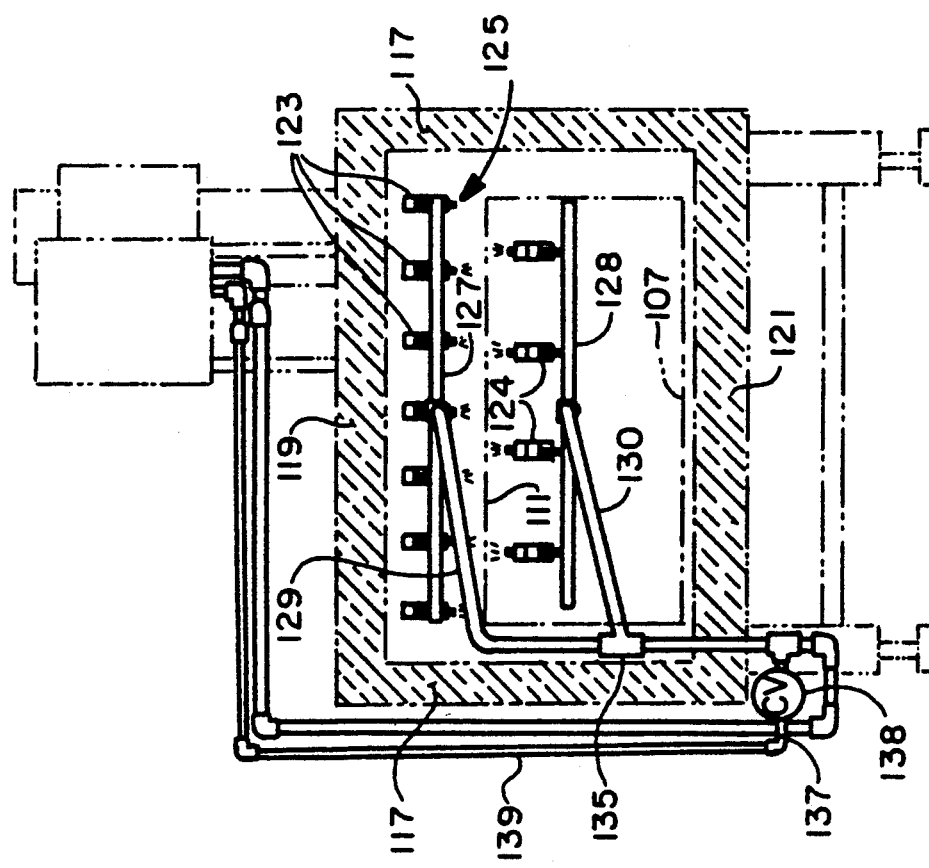
FIG. 6 is a vertical sectional view taken generally along the line 6—6 of FIG. 5.

The liquid control valve 87 modulates both the pressure and the flow rate of the liquid $CO_2$ supplied to the feed pipe, and the use of injectors 69 having spring-loaded conical stems which function to create orifices of variable areas results in the injection of cryogen into the freezer at a substantially greater rate when higher liquid $CO_2$ pressures are applied. The control is such that, should a temperature be reached within the freezer above the desired temperature range, supply of cryogen through the injectors 69 may be momentarily halted; however, during normal operations, the controlled flow of $CO_2$ liquid keeps the temperature within the desired range. As mentioned, any blockages at the injectors are self-clearing because the design causes $CO_2$ vapor to migrate to the site and melt the solid $CO_2$ causing the blockage. Although as earlier indicated there are particular advantages to a freezer wherein liquid $CO_2$ is directly injected so as to cause impingement upon food products being transported along a helical conveyor, there are many applications for which straight-line tunnel freezers are adequate or may even be preferred. Shown in FIGS. 5 and 6 is a $CO_2$ tunnel freezer 101 wherein an insulated freezer enclosure 103 is provided which provides a straight-line freezer path wherein an endless conveyor belt 107 driven by a standard motor drive 108 travels from a loading station 109, through a straight-line freezing region or section 111 to an unloading station 113. The freezing of food products on the belt results from heat transfer to the cold gas being circulated by blowers 115 mounted within the enclosure having electric motors which are supported on the upper wall of the tunnel and from heat transfer to $CO_2$ snow sprayed downward against the upper surfaces of the moving food products and, optionally, sprayed upward against their lower surfaces.

In this embodiment, the insulated enclosure 103 is extended in a longitudinal direction to create a tunnel which extends from an entrance to an exit and is defined by a pair of vertical sidewalls 117, a top wall 119 and a bottom wall 121. $CO_2$ injectors in the form of spray nozzles 123 are located in the upper region of the tunnel above the conveyor belt 107 generally along the undersurface of the top wall of the enclosure, and the $CO_2$ snow from the nozzles is directed against the food products moving therebeneath. Optionally, additional spray nozzles 124 are located in the central region between the upper and lower runs of the belt 107 so as to spray $CO_2$ snow through the porous belt against the undersurfaces of the food products. The blowers or fans 115 are appropriately located to circulate vapor throughout the enclosure and direct the vapor in the upper region downward onto the food products passing therebelow to cool the food products by heat transfer to the vapor from the warmer surfaces thereof.

Arrays 125 of spray nozzles are located to spray liquid $CO_2$ downward toward the food products traveling along the porous conveyor belt, which arrays are fed from a manifold 127 that is interconnected to a vertical feed pipe 131 via a distribution pipe arrangement 129 having legs which are preferably oriented at least slightly above the horizontal. A liquid $CO_2$ supply line 132 supplies liquid $CO_2$ to the three vertical pipes 131, being connected to each at a location outside of its entrance into the tunnel through the bottom wall 121. Similar arrays 128 of upward-directed nozzles are located below the upper run of the belt 107 and similarly connected by piping 130 to the vertical feed pipes 131 at tee connectors 135.

As best seen in FIG. 6, each of the manifolds 127 serves as a support for seven spring-loaded spray nozzles 123 to which it supplies liquid $CO_2$. A control valve 133 is located conveniently above the tunnel as a part of a $CO_2$ control panel 141. Thus, this valve controls the supply of liquid $CO_2$ to all the spray nozzles. A connection is made to a $CO_2$ vapor supply line 139 at a location downstream of the control valve 133 via branch tubing 137 that preferably contains a check valve 138. The pressure in the $CO_2$ liquid line upstream of the valve 133 and in the $CO_2$ vapor line 139 may be controlled by suitable valving (not shown) located at the $CO_2$ supply vessel or in the control panel, as well known in this art. As previously discussed, the pressure within the vapor line 139 is maintained above about 75 psig and preferably at a pressure just slightly above the pressure at which the spring-loaded spray nozzles 123 and 124 are set to open. The pressure within the $CO_2$ liquid supply line 132 is generally maintained somewhere between about 200 and 300 psig.

The $CO_2$ liquid pressure supplied to the spring-loaded spray nozzles 123 is controlled by the control valve 133 which receives a suitable signal from within the control panel 141 and is preferably capable of regulating the downstream pressure as opposed to merely being an on-off valve. Again, a temperature monitoring device, such as thermocouple 143, is appropriately located within the tunnel and is electrically connected to transmit the signal which it generates to the control panel 141. Control circuitry within the panel compares the signal to the temperature which it is desired to maintain within the tunnel, and the control valve 133 is appropriately regulated to achieve a rate of injection of liquid $CO_2$ that will maintain the desired temperature.

Whenever the control panel 141 signals the valve 133 to open, liquid $CO_2$ flows through the manifolds and is injected through all of the snow-making nozzles 123 downward onto the food products being carried thereunder on the moving conveyor belt 107 as well as upward from the nozzles 124 against the undersurfaces of food products, such as hamburger patties. When there is a large amount of food being frozen, a high rate of injection of $CO_2$ may be required, and the control panel 141 will cause the valve 133 to open widely to supply liquid $CO_2$ near the top of the pressure range that will result in a fairly high rate of $CO_2$ flow through the spray nozzles 123 and 124. Any small amounts of $CO_2$ snow formed within the liquid lines, will be carried to the upstream surfaces of the nozzles where potential accumulations can occur and cause clogging of one or more of the orifices. However, when there is no flow of liquid in a line leading to a particular nozzle, vapor which is created downstream of the control valve 133 will gravitate to a clogged or closed nozzle. The warmer vapor, upon reaching such solid $CO_2$, will melt the solid $CO_2$ and thus alleviate any blockage or potential blockage. Accordingly, the system illustrated in FIGS. 5 and 6 is self-unclogging, as was that previously described with regard to the embodiments shown in FIGS. 1 through 4, and it is particularly advantageous in that it facilitates the optional inclusion of upward directed nozzles that spray solid $CO_2$ against the undersurfaces of the food products.

Although not illustrated in FIGS. 5 and 6, each liquid $CO_2$ pipe 131 protruding upward through the bottom wall 121 is preferably located within a surrounding casing, such as that illustrated in FIG. 4, to provide a natural convection flow of ambient atmosphere.

Although it is preferred that spray nozzles be employed that are spring-loaded to the closed position, it would be possible to employ spray nozzles in the form of relatively small orifices in a manifold of very substantially larger diameter to serve as simple spray orifices which inject a plurality of sprays of solid $CO_2$ downward onto an underlying conveyor or otherwise into a freezing region where food products are being frozen. For example, a manifold having an inner diameter of about ⅜ inch could be provided with a series of drilled holes of about 0.045 inch diameter that serve as spray orifices. With such an arrangement, a simple off-on valve might be used to supply liquid $CO_2$ at normal tank pressure, i.e. about 300 psig, which would flow downstream of such off-on valve to the nozzles and expand to form streams or sprays of solid $CO_2$ particles and cold $CO_2$ vapor upon reaching the atmospheric side of the orifices. A modulating valve might be used instead of an off-on valve to provide some flow control. A gassing arrangement would be interconnected with each line downstream of the control valve, generally similar to that depicted in FIG. 4, which would supply $CO_2$ vapor from the storage tank at a pressure reduced to about 150 psig. The overall control system might incorporate a suitable timer which would be activated each time the closing of the control valve terminates the supply of liquid $CO_2$ to the manifold, and such timer might allow $CO_2$ vapor to flood the piping and the manifold for a sufficient length of time, e.g. about 30 seconds, to insure that all of the liquid $CO_2$ in the line had either been expelled through an orifice or had turned to 150 psig vapor. In this way, it is assured that the interior of the piping downstream of the control valve and the manifold remains clear of solid $CO_2$.

Although the invention has been described with regard to certain preferred embodiments, it should be understood that various changes and modifications as would be obvious to one having the ordinary skill in this art may be made without departing from the scope of the invention which is defined in the claims appended hereto. For example, instead of locating spray nozzles vertically above and/or below the conveyor belt in a tunnel freezer, some could also be located in the regions alongside the belt and directed downward and inward toward the upper surface of the conveyor. Instead of using a single control valve as illustrated in a tunnel freezer, one or more manually adjustable valves could be incorporated upstream of one or more of the individual manifolds to preferentially adjust the rate of flow through different manifolds. Individual inducers, such as are disclosed in U.S. Pat. No. 4,356,707, may also be provided adjacent the spray nozzles to supplement the flow of vapor in certain regions where it is desired to create a still higher rate of vapor flow. Although it is believed there are particular advantages to incorporating the system in a freezer wherein food products are delivered to the freezing region on a conveyor belt, the invention may also be employed in cabinet freezers such as those described in detail in U.S. Pat. No. 4,356,707, issued Nov. 2, 1982, the disclosure of which is incorporated herein by reference, wherein food products are delivered manually to a freezing region through a hinged door. Even though the apparatus is expected to find its primary commercial use as a freezer for food products and, as such, it has been so referred to hereinbefore, it should be understood that it can be employed to significantly lower the temperature or chill any products and that the term freezer is used to broadly describe apparatus capable of such use and is not intended to be limiting of the apparatus.

Particular features of the invention are emphasized in the claims that follow.

What is claimed is:

1. A carbon dioxide food freezer comprising
   a thermally insulated enclosure;
   at least one endless flexible conveyor belt within said enclosure for transporting food products being frozen through said enclosure,
   means for driving said conveyor belt;
   blower means for circulating gas within said enclosure to withdraw heat from food products being frozen, and
   refrigeration means for cooling the gas within said enclosure to a temperature of about $-30°$ F. or below, said refrigeration means comprising a carbon dioxide injection system for injecting liquid $CO_2$ through orifices into said enclosure, said injection system including a plurality of spray nozzles having said orifices, flow control means and piping which leads generally vertically upward from said flow control means to said spray nozzles, the portion of said piping located within said thermally insulated enclosure and extending to said nozzles containing only horizontal and upward oriented sections whereby there is a natural gravitational flow of $CO_2$ vapor to the vicinity of said spray nozzles where said vapor melts any solid carbon dioxide that forms at the upstream side of said orifices of said spray nozzles.

2. A food freezer according to claim 1 wherein said $CO_2$ injection system includes at least one tubular distribution header located at least partially in said insulated enclosure for supplying liquid $CO_2$ to a plurality of said spray nozzles in communication with said header, and a jacket surrounding said tubular header and being located at least partially in said insulated enclosure which provides a generally annular region which is open to atmospheric convection flow.

3. A food freezer according to claim 2 wherein said tubular header is a vertical pipe and means is provided for mounting said spray nozzles generally adjacent said pipe at different vertical levels.

4. A food freezer according to claim 3 wherein spring-loaded means is provided for closing said orifices of said spray nozzles, means is provided for supplying liquid $CO_2$ to said pipe at a pressure of at least about 200 psig and means is provided for supplying gaseous $CO_2$ to pressurize the interior of said pipe at a pressure above the triple point pressure of $CO_2$.

5. A food freezer according to claim 1 wherein said injection system includes at least two distribution manifolds which extend generally horizontally, wherein said insulated enclosure is a longitudinally extending tunnel and wherein said conveyor belt extends in a straight line within said tunnel, said spray nozzle means being carried by said distribution manifolds which are located respectively at vertical levels both above and below said conveyor belt.

6. A food freezer according to claim 1 wherein said conveyor belt includes a helical section arranged about a vertical axis.

7. A food freezer according to claim 6 wherein said injection means is positioned to inject liquid $CO_2$ radially inward so that $CO_2$ snow injected therefrom impinges upon food products carried on said belt.

8. A carbon dioxide food freezer comprising
a thermally insulated enclosure,
entrance means in said enclosure for supplying food products to be frozen to a freezing region with said enclosure;
blower means for circulating gas within said enclosure to withdraw heat from good products being frozen,
refrigeration means for cooling the gas within said enclosure to a temperature of about $-30°$ F. or below, said refrigeration means comprising a carbon dioxide injection system for injecting liquid $CO_2$ through orifices into said enclosure, and
said injection system including
a plurality of spray nozzles mounted within said thermally insulated enclosure at vertical levels above at least a portion of said freezing region and having said orifices;
flow control means and
piping which leads from said flow control means to said spray nozzles, the portion of said piping located within said thermally insulated enclosure, which extends to said spray nozzles, containing only horizontal and upward oriented sections whereby there is a natural gravitational flow of $CO_2$ vapor to the vicinity of spray nozzles where said vapor melts any solid carbon dioxide that forms at the upstream side of said orifices of said spray nozzles.

9. A method of cryogenically freezing food products, which method comprises providing a thermally insulated enclosure having an entrance through which food products can be delivered, delivering such food products to a freezing region within said enclosure, injecting liquid $CO_2$ through a plurality of spray nozzles located above at least portions of said freezing region, supplying said liquid $CO_2$ through piping which extends vertically upward within the insulated enclosure to the spray nozzles from a lower entrance thereinto, controlling the flow of liquid $CO_2$ to said spray nozzles by valve means located upstream of said entrance so that there is a natural gravitational flow of vapor to the vicinity of said spray nozzles where it melts any solid $CO_2$ at the upstream side of the orifices of said spray nozzles.

10. A method according to claim 9 wherein said liquid $CO_2$ travels upward through a vertical pipe located within said thermally insulated enclosure while a convection flow of ambient air from the atmosphere is established in an annular region located within said thermally insulated enclosure surrounding said pipe.

11. A method according to claim 9 wherein the orifices of said spray nozzles are spring-loaded to the closed position, liquid $CO_2$ is supplied to the vertical pipe at a pressure of at least about 200 psig and the interior of said pipe is pressurized with gaseous $CO_2$ at a pressure above the triple point pressure of $CO_2$ upon halting supply of said liquid $CO_2$.

12. A method according to claim 11 wherein said gaseous $CO_2$ is supplied to said vertical pipe at a pressure above the pressure at which said spray nozzles are spring-loaded to close so that a flow of gaseous $CO_2$ is established through said spray nozzles when said flow of liquid $CO_2$ is terminated by said valve means.

13. A method according to claim 9 wherein particles of solid $CO_2$ are sprayed against the upper surfaces and the undersurfaces of food products being conveyed through said freezing region by injection of liquid $CO_2$ through said spray nozzles.

* * * * *